Aug. 2, 1932.  L. P. SELDEN  1,869,868
RUBBER PRINTING STAMP
Filed July 2, 1931
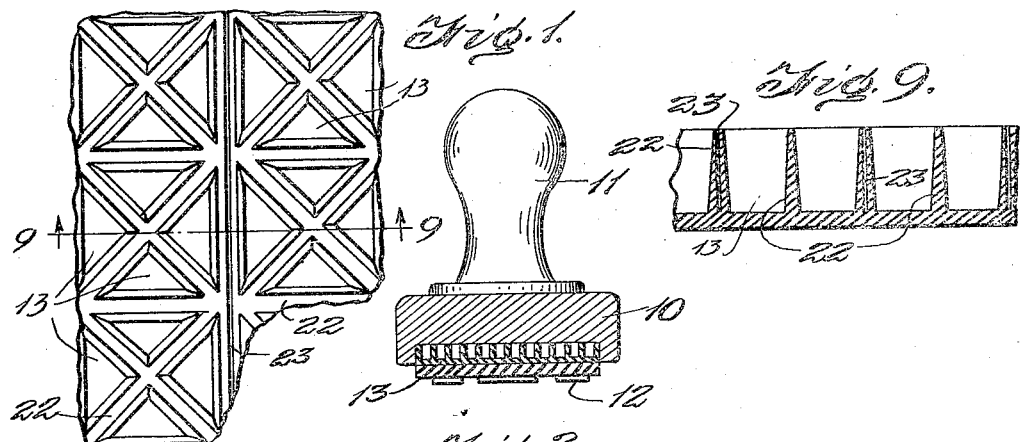
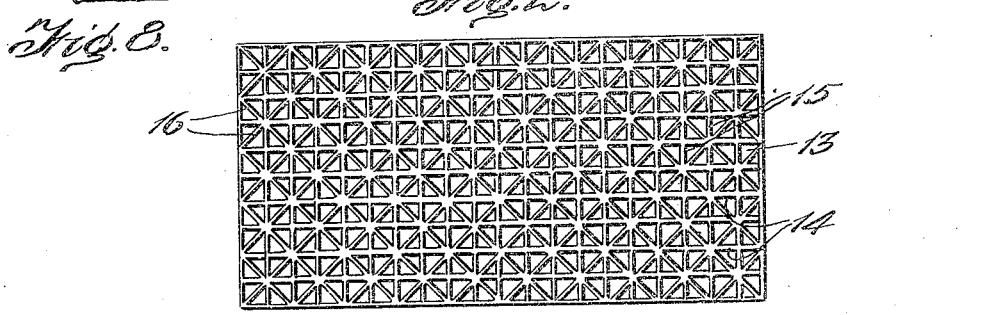
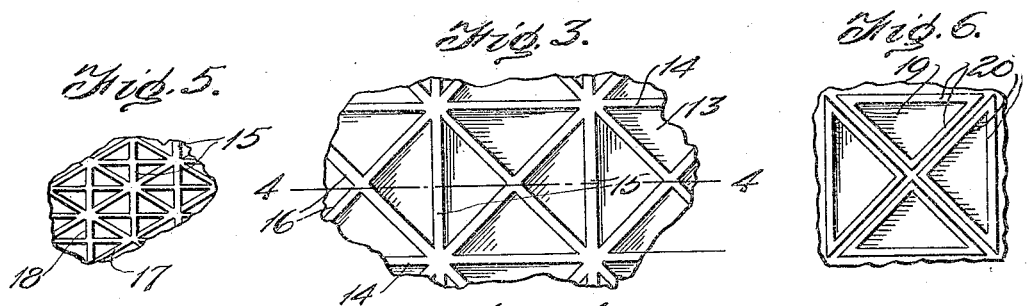
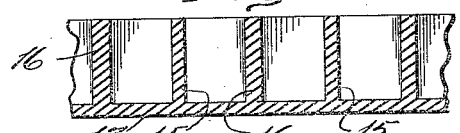
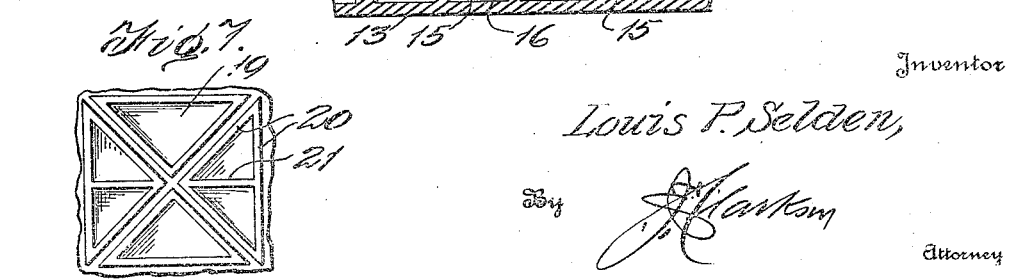
Inventor
Louis P. Selden,
By
Attorney Patented Aug. 2, 1932

1,869,868

UNITED STATES PATENT OFFICE

LOUIS P. SELDEN, OF RICHMOND, VIRGINIA, ASSIGNOR TO SAMUEL S. ROSENDORF, OF RICHMOND, VIRGINIA

RUBBER PRINTING STAMP

Application filed July 2, 1931. Serial No. 548,426.

This invention relates to rubber printing stamps and has special reference to type bases for rubber printing stamps.

Rubber printing stamps of the molded class generally are mounted on a wooden or metallic block and the rubber part consists of a rubber base resting against the block and having type molded on its outer face or vulcanized thereto.

In the older kind of such stamps the rubber base consisted of a thin sheet of solid rubber but such stamps were found to be defective for obtaining clear impressions if the surfaces on which the impressions were to be made or if the pressure applied to the stamp was not uniform throughout its contacting surface. Attempts have been made to cure this defect by the use of a base of sponge rubber or the employment of a base having cells formed in its block contacting face. Heretofore such cells have been generally quadrangular in outline, the cells commonly being parallelograms. It is recognized in all problems involving the rigidity of framed structures that a quadrangle is readily distortable. Consequently it has been found that such bases are apt to yield laterally when pressure is applied vertically to the handle of the stamp and that this yielding causes frequent blurring of the impression.

It is the principal object of the present invention to provide an improved cellular base wherein the cells are of such form as to avoid any distortion producing blurring while at the same time ensuring evenness of impression and to that end the invention employs triangular cells since the triangle is the only geometrical form which is inherently undistortable and is employed in bridge and roof trusses and all other places where distortion is to be avoided.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a vertical section through a rubber stamp as constructed in accordance with this invention.

Figure 2 is a top plan view of one preferred form of base.

Figure 3 is an enlarged view of a portion of Figure 2.

Figure 4 is a section on the line 4—4 of Figure 3.

Figure 5 is a view similar to Figure 3 showing one modification of the cells.

Figure 6 is a similar view showing a second modification of the cells.

Figure 7 is a similar view showing a third modification of the cells.

Figure 8 is a plan of a further modification.

Figure 9 is a section on the line 9—9 of Figure 8.

In the invention as here disclosed there is shown a rubber stamp having the usual block or head 10 provided with a handle 11 and molded type 12.

The invention itself consists of a cushioning base arranged between the type 12 and the block or head 10 and this base includes a sheet of rubber 13 forming the under face of the cushion and to which the type sheet is secured. From this sheet rises certain ribs which, in the form shown in Figures 2 and 3 comprise longitudinal ribs 14 and transverse ribs 15 which thus form a series of square cells but diagonal ribs 16 extend across these squares from corner to corner and thus divide each square into four cells the contours of which form isosceles triangles.

In the form shown in Figure 5 the diagonal ribs 17 are arranged at angles of 60° to the transverse ribs 18 which pass through the intersections of the diagonal ribs and there may be longitudinal ribs 15. The triangles thus formed are equilateral and are arranged in rows of interfitting triangles.

In the form shown in Figure 6, each cell 19 is formed by ribs independent of the ribs of the adjacent cells, the ribs 20 of each cell being arranged in the form of an isosceles triangle and four of these triangles being grouped with their bases at right angles and their apices directed toward each other. Thus the arrangement of each group forms a square somewhat like the arrangement in Figure 3.

The arrangement of Figure 7 is like that of Figure 6 except that at least two of the triangles are divided into smaller triangles by ribs 21 each running from the apex to the base of one of the large triangles.

In each form the free edges of these ribs all lie in the same plane so that the ribs contact throughout with the block 10 in the completed stamp. Thus in each instance the base or cushion has a multiplicity of cells in its upper face each of which is triangular in contour. With this construction it is found by practical test that the defects observable with cells forming parallograms are entirely overcome because the triangular arrangement of the ribs resists all lateral movement of the base on the block. Moreover, by this triangular arrangement a single work or line of rubber type is supported throughout so that evenness of impression is assured.

In Figures 8 and 9 it will be seen that the ribs 22 are tapered to narrow from their roots upwardly and that adjacent rows of cells are separated by channels 23 formed in the ribs 21 separating those rows.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A base cushion for rubber stamps including a sheet of rubber having ribs rising from its upper side and intersecting to form a multiplicity of triangles.

2. A base cushion for rubber stamps formed of soft rubber and having a multiplicity of triangular cells in its upper surface.

3. A base cushion for rubber stamps formed of soft rubber and having a multiplicity of triangular cells in its upper surface, said cells being divided each from each by narrow upstanding ribs.

4. A base cushion for rubber stamps formed of soft rubber and having a multiplicity of triangular cells in its upper surface, said cells being divided each from each by narrow upstanding ribs having their upper edges all in the same plane.

5. A base cushion for rubber stamps including a sheet of rubber having diagonal ribs upstanding from the sheet and intersecting each other throughout the extent of the sheet, and other upstanding ribs passing through certain of the intersections of the diagonal ribs.

6. A base cushion for rubber stamps including a sheet of rubber having diagonal ribs upstanding from the sheet and intersecting each other throughout the extent of the sheet, and other upstanding ribs passing through certain of the intersections of the diagonal ribs both longitudinally and transversely of the sheet to form rectangular groups of triangular cells.

7. A base cushion for rubber stamps including a sheet of rubber having ribs upstanding therefrom and extending diagonally, longitudinally and transversely of the sheet to form a series of groups of triangular cells, there being four cells in each group and the cells of each group having their base portions at right angles to each other and their apices proximal to the center of the group.

8. A base cushion for rubber stamps including a sheet of rubber having ribs rising from its upper side and intersecting to form a multiplicity of triangles, said ribs tapering to narrow from the sheet upwardly.

9. A base cushion for rubber stamps including a sheet of rubber having ribs rising from its upper side and intersecting to form a multiplicity of triangles, said ribs tapering to narrow from the sheet upwardly, and certain of said ribs having longitudinal channels therein to separate the triangles into rows.

In testimony whereof I affix my signature.

LOUIS P. SELDEN.